Oct. 1, 1940.　　P. A. ASTRADSSON　　2,216,178
FUEL COMBUSTION
Filed Nov. 4, 1937　　2 Sheets-Sheet 1

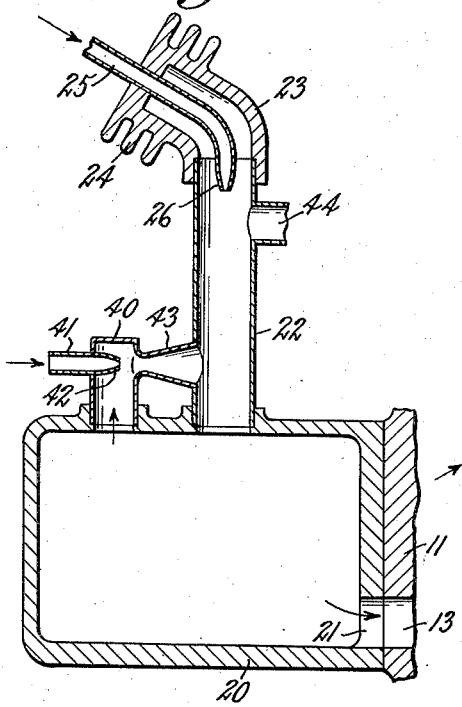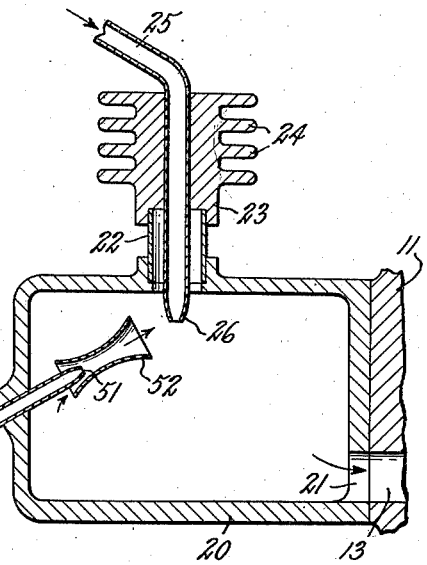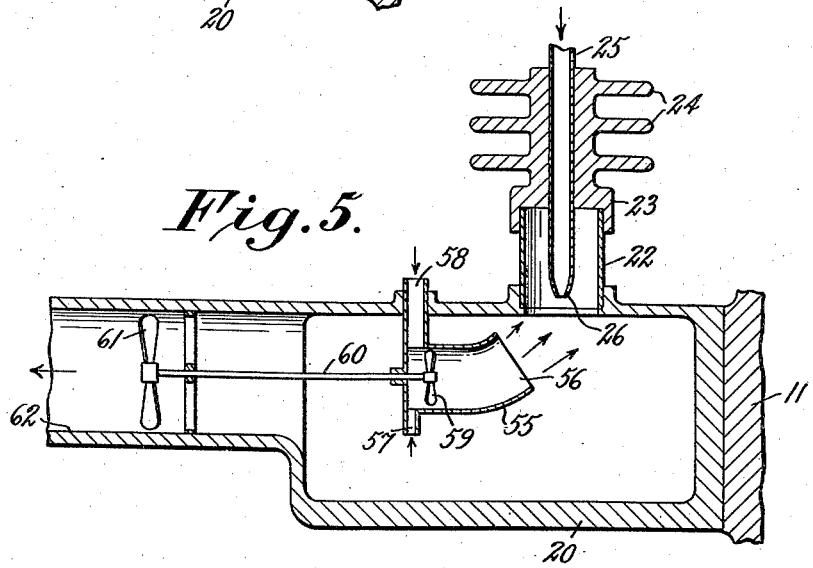

Patented Oct. 1, 1940

2,216,178

UNITED STATES PATENT OFFICE 2,216,178

FUEL COMBUSTION

Per Anton Åstradsson, Lidingo, Sweden, assignor to Svenska Aktiebolaget Gasaccumulator, Stockholm, Sweden, a corporation of Sweden Application November 4, 1937, Serial No. 172,672
In Sweden November 10, 1936

10 Claims. (Cl. 158—53)

The present invention relates to solid or liquid fuel vaporizing devices in which the fuel is caused to fall freely on the heated surface of a vaporizing chamber. When such devices are used for vaporization of fuels that are easily decomposed and have a high vaporization temperature, such as heavy mineral oils, it is necessary that the fuel be delivered to the vaporizing chamber through a nozzle or the like that is situated at a place in the vaporizer, or in a part connected thereto, having a comparatively low temperature, so that decomposition of the fuel and consequent deposits of carbon in the nozzle are avoided. In order to prevent the fuel vapor developed in the vaporizer from coming in contact with and condensing on the nozzle and the parts surrounding it which are comparatively cold, and flowing down therefrom and becoming decomposed in hotter parts of the vaporizer, it is necessary to deliver a cold dilution gas to the vaporizer in the vicinity of the nozzle.

If air or some other gas rich in oxygen is used as dilution gas to prevent condensation, and if the fuel has a vaporization temperature that is higher than its ignition temperature, special precautions are necessary to prevent combustion in the vaporizer. It has therefore been proposed that before entering a zone of the vaporizer where the temperature is higher than the lowest ignition temperature of the fuel, the air should be mixed with such a large amount of fuel that, owing to surplus of fuel, the mixture formed thereby is not ignitable at the temperature of said zone.

I have determined, however, that combustion in the vaporizer may be avoided, even if the air enters directly into a zone of the vaporizer where the temperature is higher than the lowest ignition temperature of the fuel, provided the air is quickly mixed with the hot fuel vapor present in the vaporizer, before the air has had time to be heated appreciably by the vapor or the hot surfaces of the vaporizer.

If cold air is allowed to flow directly into the fuel vapor in the vaporizer, which is at a temperature higher than its ignition temperature, this rapid mixing will not take place unless special means are provided. Fuels of the kind in question having a high molecular weight, and vapor from such fuels being highly viscous, air diffuses very slowly into this vapor. However, the layer of air nearest to the fuel vapor will be heated quickly by coming in contact with the vapor and will also soon absorb the small amount of fuel vapor that is required for an ignitable mixture of fuel and air. Owing to the preheating of the air the temperature of this mixture will be higher than the ignition temperature of the fuel, and combustion in the vaporizer results.

In accordance with my invention combustion in the vaporizer is prevented by the provision of means for accomplishing such a quick mixing of the air, or some other oxygen-containing dilution gas, with the hot fuel vapor that the air does not have time to become heated to the ignition temperature before the mixing has been completed. In order that the air shall be able to serve its purpose of preventing condensation of fuel vapor on the fuel delivery nozzle, the mixing device is arranged in such a way in relation to the nozzle and to the hot surfaces that the liquid fuel has to pass through the mixture before it comes in contact with the hot surfaces.

The mixing device is arranged to mix the air and the fuel vapor in such proportions that the dew point of the resulting mixture is lower than the lowest temperature of the surfaces with which the mixture comes in contact, but the fuel content of the mixture is so great that the mixture is not ignitable at any temperature prevailing in the vaporizer. The initial mixture may, however, have such proportions that it is ignitable at high temperature, if the air is so cold that the temperature of the mixture is lower than the ignition temperature. The mixture may then absorb an additional amount of fuel vapor so that, owing to surplus of fuel, it is not ignitable when it is thereafter heated to ignition temperature.

Further objects and advantages of my invention will be apparent from the following description considered in connection with the accompanying drawings which form part of this specification and of which:

Figs. 3, 4 and 5 are similar views of additional embodiments of my invention.

Figure 1:
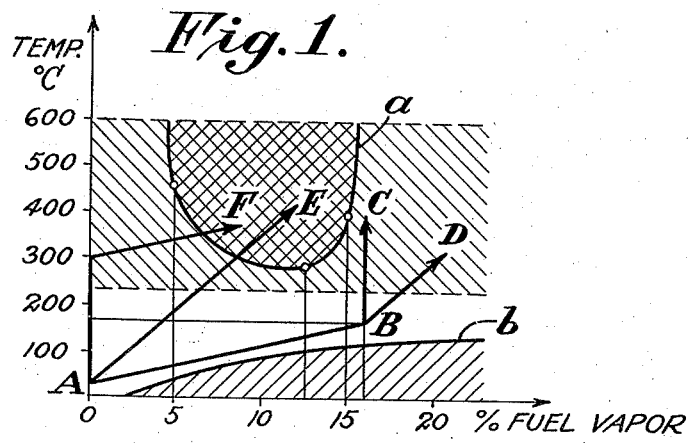
Fig. 1 is a diagram on which the temperature of a fuel vapor-air mixture is plotted against the percentage of fuel vapor in the mixture.

The diagram in Fig. 1 shows the variation of the ignition temperature and the dew point according to the vapor content for mixtures of vapor from a certain mineral oil and air. The temperature of the mixture of air and vapor in degrees centigrade is the ordinate, and the percentage of oil in the mixture is the abscissa. The upper curve $a$ in the diagram indicates the manner in which the ignition temperature of the mixture varies with the oil content within the limits of the temperatures assumed to prevail in the vaporizer, for instance at temperatures up to 600° C. It is evident from this curve that mixtures containing less than about 5% and more than about 15% of oil are not ignitable at the temperature prevailing in the vaporizer. This may be expressed by stating that the lower ignition limit of the mixture lies at about 5% of oil and its upper ignition limit at about 15% of oil. If the oil content is increased from 5% the ignition temperature decreases first quickly and then more and more slowly until it attains a minimum at about 300° C., at about 12% of oil. A further increase in oil content results in the ignition temperature rising again. Ignition and combustion of the mixture will thus take place at the temperatures and oil contents lying inside the curve a, that is, within the field marked in the figure with double cross-sectioning.

Vaporization of the most volatile ingredients of the oil begins at a temperature of about 220° C. The field within which vaporization can take place in the vaporizer is thus represented by the single cross-sectional area lying between the lines for the temperature of 220° C. and 600° C.

The lower curve b in the diagram indicates the manner in which the dew point varies with the oil content of the mixture, and condensation of oil vapor thus takes place at temperatures and oil contents within the cross-sectioned field lying between this curve and the abscissa.

If air of atmospheric temperature is supplied to the vaporizer it is evident that it must be mixed with oil vapor in such a way that the condition of the mixture, that is, its temperature and oil content, will vary along a line in the diagram that does not at any point enter either the ignition field within the curve a, or the field lying below the curve b.

Assume that a certain amount of air having a temperature of, for instance 20° C., the condition of which is represented in the diagram by the point A, enters the vaporizer and is mixed with oil vapor heated to a temperature higher than the evaporation temperature, for instance 500° C., without heat being supplied to the air or to the vapor while the mixing takes place. Such a mixture is said to be adiabatic. When the oil content has risen to, for instance, 16%, the temperature of the mixture is about 170° C. and its condition is represented by the point B in the diagram. Such a mixture is evidently not ignitable; neither is there any risk of condensation of oil as the point B is situated above the curve b. If the temperature of the nozzle or other fuel delivery arrangement exceeds about 120° C., which is the dew point of the mixture, it may come in contact with the mixture without condensation occurring. The mixture having the condition B may be heated in the vaporizer to higher temperatures without ignition taking place, as shown by the line BC in the diagram, which does not enter the ignition field within curve a. An additional amount of oil vapor may also be added to the mixture during the heating, in which case the alteration of condition continues from the point B along the line BD, without ignition taking place.

On the other hand, if the percentage of fuel vapor is increased while a considerable amount of heat is being supplied, as shown by the line AE, ignition of the mixture results as this line enters the field within curve a. It is evident from this that the mixing of oil vapor and air must take place so quickly that supply of heat while the mixing takes place is avoided as far as possible, that is, the mixing should take place as nearly adiabatically as possible, in order to avoid combustion in the vaporizer.

It is further evident from the diagram that if the air is heated, for instance to 300° C., before the mixing begins, ignition will occur even if the mixing thereafter takes place adiabatically, as indicated by the line AF. It is therefore of primary importance that the mixing of air and oil vapor takes place immediately and as quickly as possible after the air has been introduced into the vaporizer.

Figure 2:
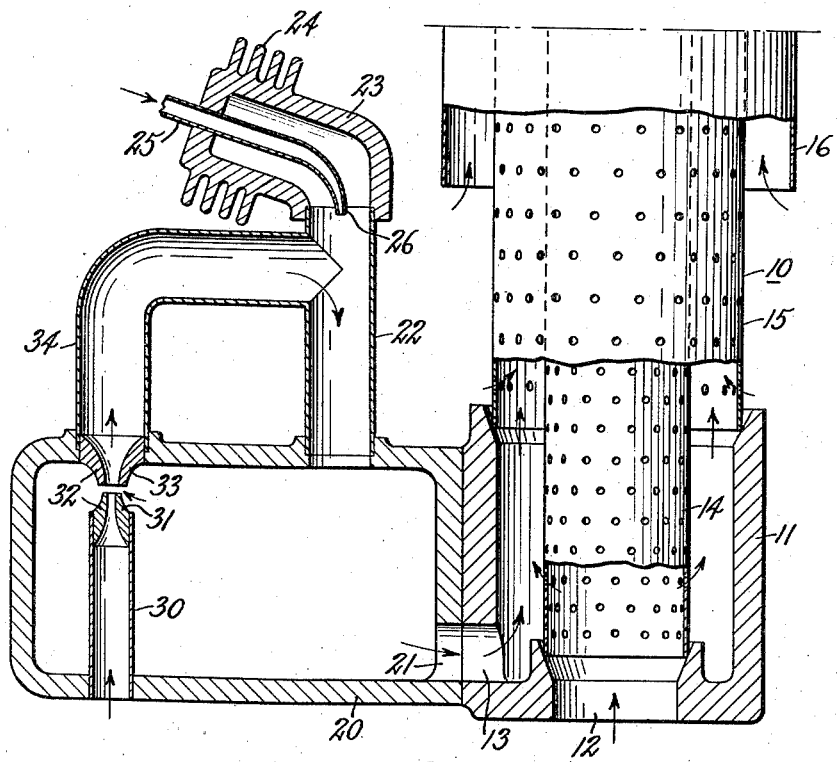
Fig. 2 is a more or less diagrammatic cross-sectional view of one embodiment of my invention.

Referring more particularly to Fig. 2, reference character 10 designates generally a vapor fuel burner. Burner 10 includes a base portion 11 of metallic heat-conducting material formed with an air inlet 12 and a vapor fuel inlet 13. Supported by base 11 are perforated burner tubes 14 and 15. As shown, the lower open end of tube 14 communicates with the air inlet 12, while the lower open end of tube 15 communicates with the annular space formed between the walls of base 11 and the exterior of tube 14. An imperforate tube 16, having an open lower end, surrounds the upper parts of perforated tubes 14 and 15. The upper end of the annular space between tubes 14 and 15 is connected to a suitable flue which provides a draft for the burner.

A vaporizer chamber 20 is formed integral or in good heat transfer relation with the base 11 of the burner and is formed with an opening 21 which communicates with the opening 13 in base 11. A vertically extending tube 22 extends upwardly from vaporizer chamber 20, and is closed at its upper end by a member 23 provided with heat dissipating flanges 24. A fuel conduit 25 extends within member 23 and terminates in a nozzle or the like 26 disposed concentrically with respect to tube 22.

The lower wall of vaporizer chamber 20 is formed with an opening through which extends a conduit 30 the lower end of which is open to the atmosphere, and the upper end of which terminates within the vaporizer chamber. Secured in the upper end of conduit 30 is a nozzle 31 of an ejector device designated generally by reference character 32. The throat member 33 of the ejector is secured in an opening formed in the upper wall of the vaporizer chamber and communicates with a conduit 34, the other end of which conduit communicates with tube 22 in the neighborhood of nozzle 26. The gap between nozzle 31 and throat 33 constitutes the suction inlet of the injector and communicates with the interior of the vaporizer.

The above described device operates as follows:

Heat produced by combustion of fuel in burner 10, in a manner to be presently described, is conducted through the walls of base 11 to the walls of vaporizer chamber 20. The latter walls are thus maintained at a high temperature, which may be in the neighborhood of 600° C. Liquid fuel is supplied through conduit 25 and drops by gravity from nozzle 26 through tube 22 to the surface of the bottom wall of vaporizer 20 where it is vaporized due to the aforesaid high temperature. Due to the partial vacuum maintained in vaporizer chamber 20 by the flue to which the burner tubes are connected, the fuel vapor thus formed flows through openings 21 and 13 to within the annular space formed in base 11. Atmospheric air is drawn in through opening 12 and flows through the perforations in tube 14. This air forms a combustible mixture with the fuel vapor in the annular space and consequently combustion takes place. Air also flows inwardly through the perforations of tube 15, where it likewise forms a combustible mixture and combustion takes place in the annular space between the tubes 14 and 15.

Due to the partial vacuum maintained in the vaporizer chamber, atmospheric air is caused to flow inwardly through conduit 30 and through nozzle 31. Due to the increase in velocity of the air as it passes through jet 31, its pressure is reduced and hot fuel vapor is drawn in through the suction inlet formed by the gap between the nozzle and throat 33. The high velocity of the air jet causes the air to become mixed with the fuel vapor so rapidly that a non-combustible mixture is formed before the air is heated to the ignition temperature. This mixture, which is too rich in fuel vapor to be combustible at the temperature prevailing anywhere within the vaporizer and has a dew point below the temperature of the nozzle 26, passes through conduit 34 to within tube 22, where it enshrouds the nozzle 26 and the liquid fuel dropping therefrom, thus preventing the vaporous fuel from the vaporizer chamber 20 at high temperature from contacting and condensing on the nozzle. The ejector 32 is so designed that the dew point of the air-fuel mixture formed thereby is below the comparatively low temperature maintained at the nozzle 26. Therefore, condensation of fuel does not occur at the nozzle or anywhere within member 23.

If the oil supplied to the vaporizer through conduit 25 is the same as that for which the diagram of Fig. 1 was made, the ejector 32 may be designed so that the mixture formed thereby contains 20% of fuel vapor. With this percentage, it is evident from the diagram that the temperature of the nozzle 26 and the member 23 may be maintained as low as approximately 140° C., without the condensation of fuel vapor occurring. Inasmuch as vaporization of the oil does not occur below about 220° C., there is thus a wide margin of approximately 80° C. within which it is suitable to maintain the temperature of the nozzle. Furthermore, from the diagram it is apparent that a mixture containing 20% of fuel vapor is not ignitable at any temperature occurring within the vaporizer and therefore this mixture may pass through tube 22 into the vaporizer proper without being ignited.

If sufficiently rapid mixture of the air and fuel vapor is not produced, the throat 33 of the ejector, or conduit 34 immediately adjacent thereto, may be provided with suitable turbulence producing baffles or the like, for increasing the rapidity of the mixing.

In Fig. 3 similar reference characters designate similar parts. In this embodiment the ejector is not located within the vaporizer chamber, as was the case in Fig. 2, but is disposed within a conduit 40 which communicates with the upper part of the vaporizer. Atmospheric air is admitted through a conduit 41 which terminates in a nozzle 42. A conduit 43, which is in the form of an ejector throat, connects the upper part of conduit 40 with tube 22. A conduit 44 leads off from tube 22 in the neighborhood of fuel nozzle 26.

The above described device operates as follows:

Liquid fuel supplied from nozzle 26 falls by gravity through tube 22 and is vaporized upon striking the hot surface of the vaporizer chamber 20. The partial vacuum maintained in the vaporizer, as described in connection with Fig. 2, causes atmospheric air to flow inwardly through conduit 41 and nozzle 42. Hot fuel vapor is drawn by the jet produced at nozzle 42 into throat 43, where it is rapidly mixed with the air, and this mixture flows upwardly through tube 22 in a direction opposite to that of the falling liquid fuel. The mixture passes from tube 22 through conduit 44, which may be arranged to lead the mixture to the burner in parallel to the flow through passage 13.

The mixture thus formed by the ejector does not enter directly into the vaporizer chamber 20. However, it is impossible to prevent hot fuel vapor from the vaporizer from passing upwardly into tube 22 and thus contacting the mixture admitted from throat 43. Therefore, it is preferable that the mixture have a sufficiently high percentage of fuel so that the mixture is too rich to be combustible. However, if the velocity of the mixture entering tube 22 is sufficiently high so that it mixes with sufficient rapidity with the fuel vapor present in the tube so that a non-combustible mixture is formed before the mixture reaches ignition temperature, no combustion can take place.

In the embodiment shown in Fig. 4 the fuel supply conduit 25 extends through tube 22 and the nozzle 26 is disposed within the vaporizer chamber proper. A conduit 50 communicates with the atmosphere and extends through the wall of the vaporizer chamber and terminates as a nozzle 51 within a throat 52. The discharge end of the throat is directed at the fuel nozzle 26, while its intake end is in communication with the interior of the vaporizer chamber. There is thus formed in the throat a mixture sufficiently rich in fuel to be non-ignitable while having a dew point below the temperature at which the nozzle 26 is maintained. This mixture is directed at the nozzle and enshrouds it, thus preventing the substantially pure fuel vapor in the vaporizing chamber 20 from contacting the nozzle and condensing thereon.

In the embodiment shown in Fig. 5 a mixing device 55 is disposed within the vaporizer chamber 20. The outlet 56 of this device is directed toward the fuel nozzle 26, in the same manner as described in connection with Fig. 4. The mixing device is provided with a fuel vapor inlet 57 and an air inlet 58. A propeller 59 is disposed within the mixing device and is mounted on a shaft 60, which carries another propeller 61 which is disposed in a conduit 62 leading from the vaporizer chamber 20 to the burner.

The flow of fuel vapor from the vaporizer through the conduit 62 to the burner causes propeller 61 to rotate, thus driving propeller 59. The rotation of the latter propeller draws fuel vapor into the mixing device 55 through the conduit 57 and also draws air through the conduit 58. The air and fuel vapor are thoroughly and rapidly mixed by the propeller and are caused to flow outwardly through the outlet 56 to enshroud the fuel nozzle 26. The mixing device is so designed that the mixture produced thereby has the desired characteristics as explained in connection with Fig. 1. Propeller 59 may be driven by an exterior source of power instead of by propeller 61 if desired.

While I have shown and described several embodiments of my invention, it is to be understood that this has been done for purposes of illustration only and that the scope of my invention is not to be limited thereby, but is to be determined by the appended claims viewed in the light of the prior art.

What I claim is:

1. In a vaporizing device, means providing a vaporizing chamber, means for heating a surface of said chamber to vaporizing temperature, means for dropping liquid fuel on said surface, means for mixing an oxygen containing gas with fuel vapor in such proportions that the mixture is incombustibly rich in fuel vapor, and means for supplying the incombustibly rich mixture so formed to the neighborhood of the fuel dropping means to enshroud the fuel dropping therefrom.

2. In a vaporizing device, means providing a vaporizing chamber, means for heating a surface of said chamber to vaporizing temperature, means for dropping liquid fuel on said surface, means for mixing a cool oxygen containing gas with hot fuel vapor in such proportions that the mixture is incombustibly rich in fuel vapor, said last mentioned means effecting the mixing so rapidly that the mixture becomes incombustibly rich before the gas is heated to ignition temperature, and means for supplying the incombustibly rich mixture so formed to a space between the hot surface and the fuel dropping means to enshroud the fuel dropping therefrom.

3. In a vaporizing device, means providing a vaporizing chamber, means for heating a surface of said chamber to vaporizing temperature, means for dropping liquid fuel on said surface, the last mentioned means being maintained at a temperature below the vaporizing and decomposition temperature of the fuel, means for mixing an oxygen containing gas with fuel vapor in such proportions that the dew point of the mixture is below the temperature of the fuel dropping means, and means for supplying the mixture so formed to fuel dropping means to enshroud the last mentoned means and the fuel dropping therefrom.

4. In a vaporizing device, means providing a vaporizing chamber, means for heating a surface of said chamber to vaporizing temperature, means for dropping liquid fuel on said surface, the last mentioned means being maintained at a temperature below the vaporizing and decomposition temperature of the fuel, means for mixing an oxygen containing gas with fuel vapor in such proportions that the dew point of the mixture is below the temperature of the fuel dropping means, and that the mixture is incombustibly rich in fuel vapor, and means for supplying the incombustibly rich mixture so formed to the neighborhood of the fuel dropping means to enshroud the last mentioned means and the fuel dropping therefrom.

5. In a vaporizing device, means providing a vaporizing chamber, means for heating a surface of said chamber to vaporizing temperature, means for dropping liquid fuel on said surface, the last mentioned means being maintained at a temperature below the vaporizing and decomposition temperature of the fuel, means for mixing an oxygen containing gas with fuel vapor in such proportions that the dew point of the mixture is below the temperature of the fuel dropping means, and that the mixture is incombustibly rich in fuel vapor, the mixing means effecting the mixing so rapidly that the mixture becomes incombustibly rich before the gas is heated to ignition temperature, and means for supplying the incombustibly rich mixture so formed to the neighborhood of the fuel dropping means to enshroud the last mentioned means and the fuel dropping therefrom.

6. In a vaporizing device, means providing a vaporizing chamber, means for heating a surface of said chamber to vaporizing temperature, means for dropping liquid fuel on said surface, means for maintaining sub-atmospheric pressure in said chamber, and an ejector having a motivating fluid inlet communicating with the atmosphere, a discharge communicating with said chamber at a place in the neighborhood of the fuel dropping means and a suction inlet communicating with said chamber at a place more remote from said fuel dropping means.

7. In a vaporizing device, means providing a vaporizing chamber having a comparatively large lower portion and a smaller upper portion extending vertically upwardly therefrom, means for heating the bottom surface of said lower portion to vaporizing temperature, a conduit opening into the upper end of said smaller portion for dropping liquid fuel through both of said portions onto said heated bottom surface, means for maintaining sub-atmospheric pressure in said chamber, and an ejector having a motivating fluid inlet communicating with the atmosphere, a discharge communicating with said smaller portion and a suction inlet communicating with said comparatively large portion of said vaporizing chamber.

8. In a vaporizing device, means providing a vaporizing chamber, means for heating a surface of said chamber to vaporizing temperature, means for dropping liquid fuel on said surface, means for maintaining sub-atmospheric pressure in said chamber, and an ejector located within said chamber and having a motivating fluid inlet communicating with the atmosphere, a discharge directed at the fuel dropping means and a suction inlet communicating with said chamber at a place more remote from said fuel dropping means.

9. In a vaporizing device, means providing a vaporizing chamber, means for heating a surface of said chamber to vaporizing temperature, means for dropping liquid fuel on said surface, means forming a mixing compartment within said chamber having an air inlet communicating with the atmosphere, a fuel inlet communicating with said chamber and an outlet directed at the fuel dropping means, a propeller within said compartment for mixing air and vaporous fuel, and means for operating said propeller.

10. The method of producing heat by the aid of a vaporizer having a vaporizing chamber and a hot contact vaporizing surface which includes dropping liquid hydro-carbon fuel on said surface to vaporize said fuel, withdrawing two streams of hot fuel vapor from said chamber, forming a gaseous mixture of the hot fuel vapor of one of said streams and an oxygen-containing gas outside of said chamber, proportioning said fuel vapor and said gas so that said mixture is incombustibly rich in fuel vapor, introducing said mixture into the neighborhood of said dropping liquid fuel and enshrouding said dropping fuel in said chamber with said incombustibly rich mixture, mixing the fuel vapor of the other of said streams with sufficient air after withdrawal from the chamber to form a combustible mixture, and burning said combustible mixture.

PER ANTON ASTRADSSON.